United States Patent
Oguma

(10) Patent No.: US 9,350,207 B2
(45) Date of Patent: May 24, 2016

(54) MOTOR AND METHOD OF MANUFACTURING MOTOR

(71) Applicant: Nidec Corporation, Kyoto (JP)

(72) Inventor: Yoshiaki Oguma, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 459 days.

(21) Appl. No.: 13/747,652

(22) Filed: Jan. 23, 2013

(65) Prior Publication Data

US 2013/0234547 A1 Sep. 12, 2013

(30) Foreign Application Priority Data

Mar. 6, 2012 (JP) ................................. 2012-048727

(51) Int. Cl.
| | |
|---|---|
| *H02K 7/14* | (2006.01) |
| *H02K 3/38* | (2006.01) |
| *H02K 15/04* | (2006.01) |
| *H02K 3/52* | (2006.01) |
| *H02K 15/00* | (2006.01) |

(52) U.S. Cl.
CPC .................. *H02K 3/38* (2013.01); *H02K 3/522* (2013.01); *H02K 11/33* (2016.01); *H02K 15/0075* (2013.01); *H02K 15/04* (2013.01); *H02K 2203/12* (2013.01); *H02K 2211/03* (2013.01); *Y10T 29/49009* (2015.01)

(58) Field of Classification Search
CPC ......... H02K 1/276; H02K 11/00; H02K 5/10; H02K 11/33; H02K 5/225; H02K 7/14; H02K 5/1735; F04D 25/0613; F04D 25/068
USPC ................................................... 310/67 R, 71
See application file for complete search history.

(56) References Cited

U.S. PATENT DOCUMENTS

| 7,812,489 | B2 | 10/2010 | Hino et al. | |
|---|---|---|---|---|
| 2008/0054735 | A1* | 3/2008 | Yoshida ................. | H02K 3/522 310/43 |
| 2008/0079325 | A1* | 4/2008 | Yamada ................. | H02K 3/522 310/67 R |
| 2008/0150401 | A1* | 6/2008 | Lin ........................ | F04D 29/646 310/67 R |
| 2011/0198952 | A1 | 8/2011 | Nakamura et al. | |

FOREIGN PATENT DOCUMENTS

| CN | 101009446 A | 8/2007 |
|---|---|---|
| JP | 09-285075 A | 10/1997 |
| JP | 2009-148103 A | 7/2009 |
| JP | 2011-167024 A | 8/2011 |

* cited by examiner

*Primary Examiner* — Joshua Benitez-Rosario
*Assistant Examiner* — Leda Pham
(74) *Attorney, Agent, or Firm* — Keating & Bennett, LLP

(57) ABSTRACT

An insulator of a motor includes a body portion and a wire guide portion. The body portion is arranged to cover an upper surface, a lower surface, and circumferential side surfaces of each of a plurality of teeth. The wire guide portion is arranged to project downward from the body portion. A drawn-out portion of an electric wire which extends from a coil is arranged to reach a land portion arranged on a lower surface of a circuit board after passing through the wire guide portion. In addition, an area of contact between the drawn-out portion and the wire guide portion is arranged at an axial height lower than that of the lower surface of the circuit board.

11 Claims, 12 Drawing Sheets

MOTOR AND METHOD OF MANUFACTURING MOTOR

BACKGROUND OF THE INVENTION

1. Field of the Invention

The present invention relates to a motor and a method of manufacturing the motor.

2. Description of the Related Art

Drive currents for a motor are typically supplied to coils through a circuit board on which an electronic circuit is mounted. Structures for electrically connecting an electric wire drawn out from any coil to the circuit board are disclosed, for example, in JP-A 09-285075 and JP-A 2011-167024.

JP-A 09-285075 includes the following: terminals of coils of a stator are inserted into holes of a printed circuit board, and are connected to corresponding portions of circuitry through solder (see paragraphs [0029] to [0032] and FIGS. 5 to 10 of JP-A 09-285075). JP-A 2011-167024 includes the following: a terminal of an electric wire of a coil is wound around a terminal to define a bound portion, and a tip portion of this terminal is fitted into a cut portion while at the same time the bound portion and a land portion of a circuit board are electrically connected to each other through solder or the like (see paragraph [0032] and FIG. 6 of JP-A 2011-167024).

However, in the case where the electric wire is wound around a pin-shaped terminal, tension of the wound electric wire may vary depending on the operator. Too strong of a tension of the electric wire leads to a deformation of the terminal or damage of the electric wire. Therefore, a careful operation is required of the operator. In addition, an upper surface of the circuit board and the stator are often arranged in close axial proximity to each other. In the case where the electric wire is soldered to the upper surface of the circuit board, a soldering operation is therefore difficult.

Meanwhile, in the case where the electric wire is soldered to a lower surface of the circuit board, the stator does not easily interfere with the soldering operation. However, when an electric wire extending from a coil is drawn out beyond the lower surface of the circuit board, the electric wire may easily make contact with an edge of the circuit board. Therefore, damage or breaking of the electric wire may easily occur due to contact between the electric wire and the edge of the circuit board.

SUMMARY OF THE INVENTION

A motor according to a first preferred embodiment of the present invention includes a stationary portion, and a rotating portion supported to be rotatable with respect to the stationary portion. The stationary portion includes a plurality of teeth arranged to extend radially with a central axis extending in a vertical direction as a center; an insulator made of a resin and attached to the teeth; coils each of which is defined by an electric wire wound around the insulator; and a circuit board arranged below the coils, and including a land portion arranged on a lower surface thereof. The rotating portion includes a magnet or magnets arranged radially opposite to the teeth. The insulator includes a body portion arranged to cover an upper surface, a lower surface, and circumferential side surfaces of each of the teeth; and a wire guide portion arranged to project downward from the body portion. The electric wire includes a drawn-out portion extending from one of the coils and arranged to reach the land portion arranged on the lower surface of the circuit board after passing through the wire guide portion. An area of contact between the drawn-out portion and the wire guide portion is arranged at an axial height lower than that of the lower surface of the circuit board.

A method of manufacturing a motor according to a second preferred embodiment of the present invention is a method of manufacturing a motor including a plurality of teeth arranged to extend radially with a central axis extending in a vertical direction as a center, an insulator made of a resin and including a body portion attached to the teeth and a wire guide portion arranged to extend downward from the body portion, coils each of which is defined by an electric wire wound around the body portion, and a circuit board arranged below the coils. The method includes the steps of: a) winding the electric wire around the body portion to define each coil; b) arranging the circuit board below the coils and at an axial height higher than that of a lower end portion of the wire guide portion; c) passing a drawn-out portion of the electric wire which extends from one of the coils through the wire guide portion, and directing the drawn-out portion toward a land portion arranged on a lower surface of the circuit board; d) soldering the drawn-out portion to the land portion; and e) moving the circuit board downward relative to the insulator. After step e), an area of contact between the drawn-out portion and the wire guide portion is positioned at an axial height lower than that of the lower surface of the circuit board.

According to the first preferred embodiment of the present invention, the area of contact between the drawn-out portion and the wire guide portion is arranged at an axial height lower than that of the lower surface of the circuit board. This contributes to preventing the drawn-out portion from making contact with an edge of the circuit board so as to prevent damage of the drawn-out portion.

According to the second preferred embodiment of the present invention, the area of contact between the drawn-out portion and the wire guide portion is arranged at an axial height lower than that of the lower surface of the circuit board. This contributes to preventing the drawn-out portion from making contact with an edge of the circuit board. Moreover, after the drawn-out portion is soldered to the land portion, the distance between the land portion and the contact area is decreased. As a result, tension acting on the drawn-out portion between the land portion and the contact area is reduced. As a result of the above, the likelihood that the drawn-out portion will be damaged is reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel or substantially parallel to a central axis of a motor is referred to by the term "axial direction", "axial", or "axially", that directions perpendicular or substantially perpendicular to the central axis of the motor are referred to by the term "radial direction", "radial", or "radially", and that a direction along a circular arc centered on the central axis of the motor is referred to by the term "circumferential direction", "circumferential", or "circumferentially". It is also assumed herein that an axial direction is a vertical direction, and that a side on which coils are arranged with respect to a circuit board is defined as an upper side. The shape of each member or portion and relative positions of different members or portions will be described based on the above assumptions. It should be noted, however, that the above definitions of the vertical direction and the upper side are simply made for the sake of convenience in description, and should not be construed to restrict in any way the orientation of a motor according to any embodiment of the present invention when the motor is manufactured or in use.

Figure 1:
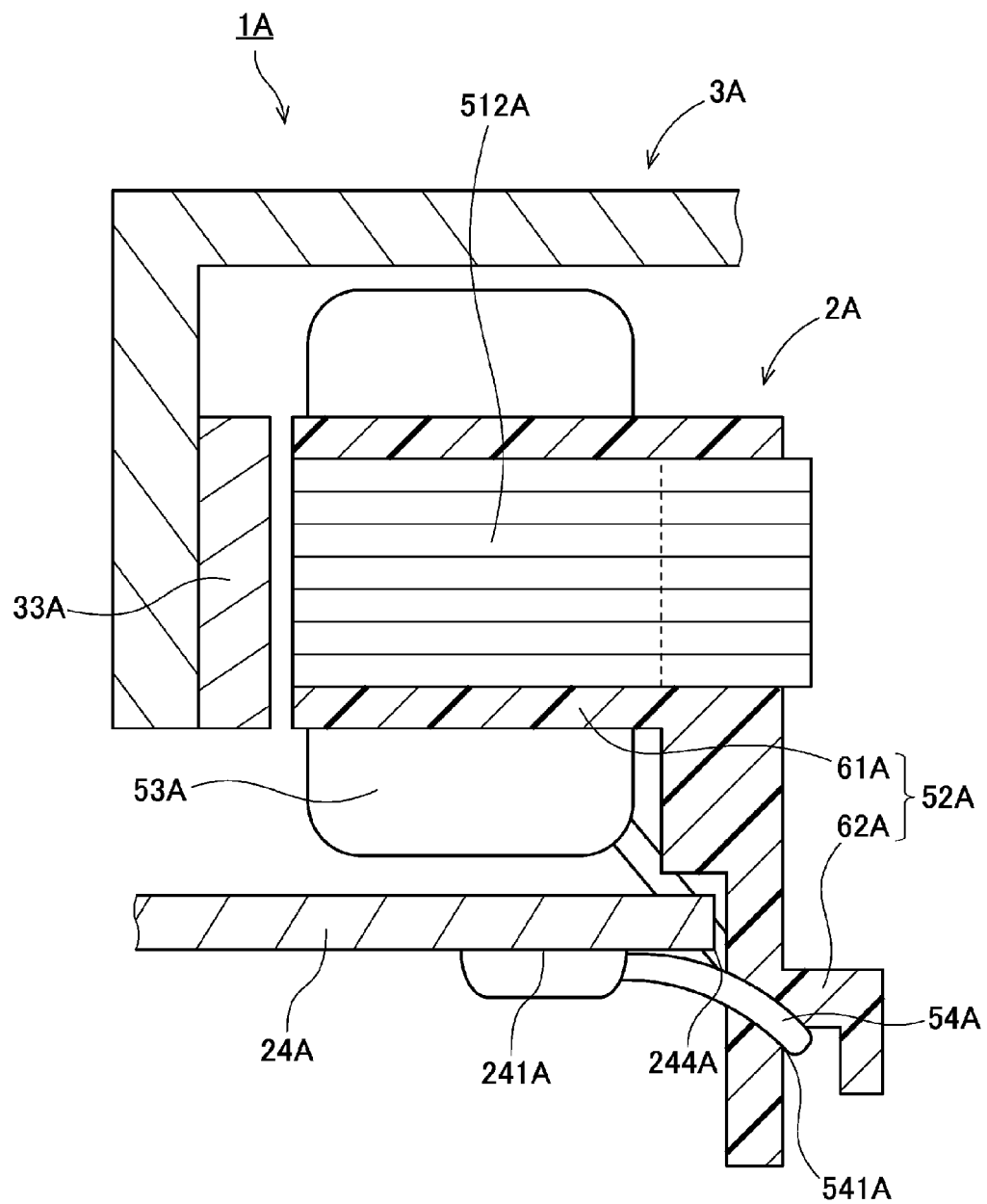
FIG. 1 is a partial vertical cross-sectional view of a motor according to a preferred embodiment of the present invention.

FIG. 1 is a partial vertical cross-sectional view of a motor 1A according to a preferred embodiment of the present invention. Referring to FIG. 1, the motor 1A includes a stationary portion 2A and a rotating portion 3A. The rotating portion 3A is supported to be rotatable with respect to the stationary portion 2A.

The stationary portion 2A preferably includes a plurality of teeth 512A, an insulator 52A, coils 53A, and a circuit board 24A. The teeth 512A are arranged to extend radially with a central axis as a center. The insulator 52A is preferably made of a resin, and is attached to the teeth 512A. The insulator 52A includes a body portion 61A and a wire guide portion 62A. The body portion 61A is attached to the teeth 512A. The body portion 61A is arranged to cover an upper surface, a lower surface, and circumferential side surfaces of each of the teeth 512A. The wire guide portion 62A is arranged to project downward from the body portion 61A.

Each coil 53A is preferably defined by an electric wire wound around the insulator 52A. More specifically, each coil 53A is defined by an electric wire wound around the body portion 61A of the insulator 52A. The circuit board 24A is arranged below the coils 53A. A land portion 241A is arranged on a lower surface of the circuit board 24A. The rotating portion 3A includes a magnet or magnets 33A. The magnet(s) 33A are arranged radially opposite to the teeth 512A.

A drawn-out portion 54A of the electric wire which extends from one of the coils 53A is arranged to reach the land portion 241A of the circuit board 24A after passing through the wire guide portion 62A. Referring to FIG. 1, an area 541A of contact between the drawn-out portion 54A and the wire guide portion 62A is preferably arranged at an axial height lower than that of the lower surface of the circuit board 24A. This contributes to preventing the drawn-out portion 54A from making contact with an edge 244A of the circuit board 24A so as to prevent damage of the drawn-out portion 54A.

When the motor 1A is manufactured, the electric wire is preferably first wound around the body portion 61A of the insulator 52A to define each of the coils 53A. Next, the circuit board 24A is preferably arranged below the coils 53A and at an axial height higher than that of a lower end portion of the wire guide portion 62A. Then, the drawn-out portion 54A of the electric wire which extends from the coil 53A is preferably passed through the wire guide portion 62A, and is then directed toward the land portion 241A arranged on the lower surface of the circuit board 24A. The drawn-out portion 54A is then soldered to the land portion 241A.

Thereafter, the circuit board 24A is moved downward relative to the insulator 52A. That is, after the drawn-out portion 54A is soldered to the land portion 241A, the distance between the contact area 541A and the land portion 241A is decreased. Tension acting on the drawn-out portion 54A between the contact area 541A and the land portion 241A is thus reduced. This contributes to preventing damage of the drawn-out portion 54A.

Note that the contact area 541A is preferably positioned at an axial height lower than that of the lower surface of the circuit board 24A when manufacture of the motor 1A is complete. This arrangement contributes to preventing the drawn-out portion 54A from making contact with the edge 244A of the circuit board 24A, and thus preventing or substantially preventing damage of the drawn-out portion 54A.

Figure 2:
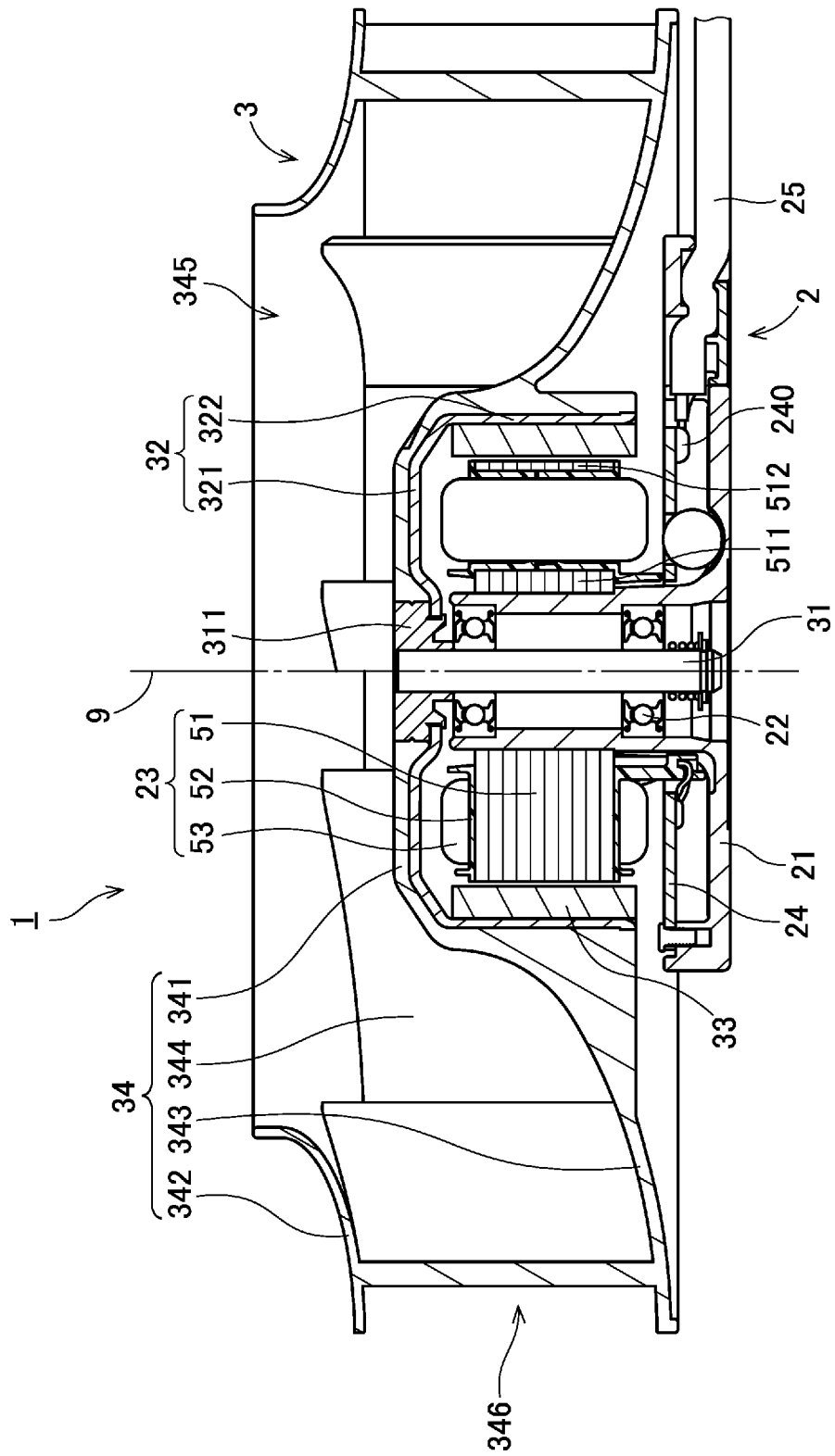
FIG. 2 is a vertical cross-sectional view of a fan motor according to a preferred embodiment of the present invention.

FIG. 2 is a vertical cross-sectional view of a fan motor 1 according to a specific preferred embodiment of the present invention. The fan motor 1 is arranged to generate cooling air currents, and is to be installed in a device, such as, for example, a server, a router, a communication base, a switch device, etc. Note, however, that motors according to other preferred embodiments of the present invention may be motors used in applications other than fans, if so desired. Also note that motors according to other preferred embodiments of the present invention may be installed in transportation apparatuses, such as, for example, automobiles, household electrical appliances, office automation appliances, medical appliances, etc.

Referring to FIG. 2, the fan motor 1 includes a stationary portion 2 and a rotating portion 3. The stationary portion 2 is fixed to a frame of a device in which the fan motor is installed. The rotating portion 3 is supported to be rotatable with respect to the stationary portion 2.

Figure 3:
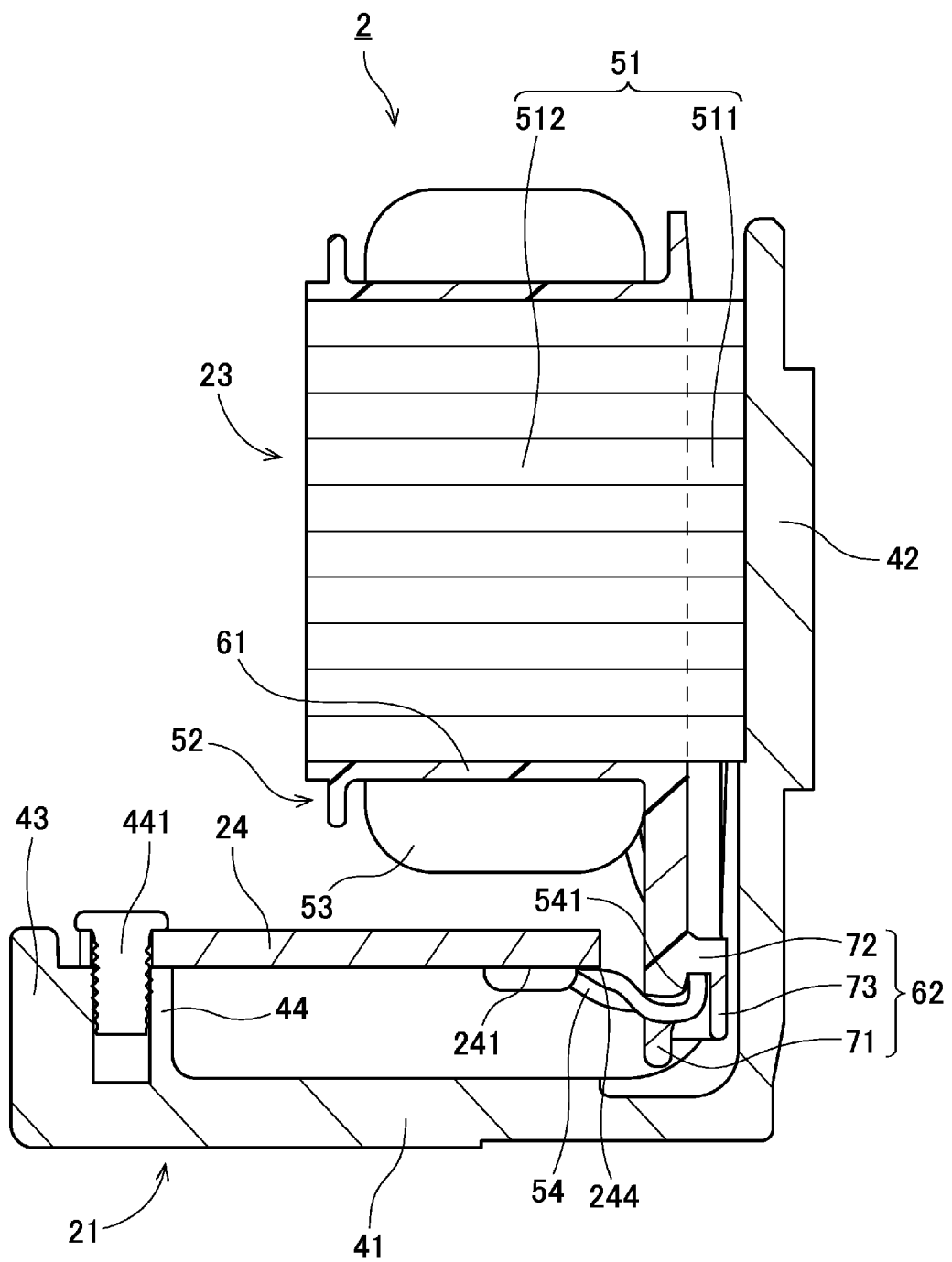
FIG. 3 is a partial vertical cross-sectional view of a stationary portion according to a preferred embodiment of the present invention.

The stationary portion 2 according to the present preferred embodiment preferably includes a base member 21, bearing portions 22, an armature 23, and a circuit board 24. FIG. 3 is a partial vertical cross-sectional view of the stationary portion 2. In the following description, reference will be made to FIG. 3 appropriately in addition to FIG. 2.

The base member 21 is arranged to support the bearing portions 22, the armature 23, and the circuit board 24. A metal, such as aluminum, or a resin, for example, is preferably used as a material of the base member 21. Referring to FIG. 3, the base member 21 preferably includes a bottom plate portion 41, a bearing support portion 42, and an outer wall portion 43. The bottom plate portion 41 is arranged to extend in directions perpendicular or substantially perpendicular to a central axis 9 below the circuit board 24. The bottom plate portion 41 preferably is substantially in the shape of a plate. The bearing support portion 42 is arranged to extend upward from an inner circumferential portion of the bottom plate portion 41. The bearing support portion 42 is substantially cylindrical. The outer wall portion 43 is arranged to extend upward from an outer circumferential portion of the bottom plate portion 41.

The bearing portions 22 define a mechanism to rotatably support a shaft 31, which is included in the rotating portion 3. A ball bearing, in which an outer race and an inner race are caused to rotate relative to each other through balls, is preferably used as each of the bearing portions 22 according to the present preferred embodiment. The outer race of each bearing portion 22 is fixed to an inner circumferential surface of the bearing support portion 42, while the inner race of each bearing portion 22 is fixed to the shaft 31. Note, however, that a bearing of another type, such as, for example, a plain bearing, a fluid bearing, etc. may be used instead of the ball bearings.

The armature 23 preferably includes a stator core 51, an insulator 52, and coils 53. The stator core 51 is preferably defined by, for example, laminated steel sheets, i.e., electromagnetic steel sheets, such as silicon steel sheets, placed one upon another in the axial direction. The stator core 51 includes a core back 511 and a plurality of teeth 512. The core back 511 is annular, and is arranged to be coaxial with the central axis 9. The teeth 512 are arranged to project radially outward from the core back 511. The core back 511 is fixed to an outer circumferential surface of the bearing support portion 42. The teeth 512 are preferably arranged at regular or substantially regular intervals in a circumferential direction. The teeth 512 are arranged to extend radially with respect to the central axis 9.

The insulator 52 is preferably attached to each of the teeth 512 of the stator core 51. The insulator 52 is preferably made of an electrically insulating resin, for example. Referring to FIG. 3, the insulator 52 preferably includes a body portion 61 and wire guide portions 62. The body portion 61 is preferably arranged to cover an upper surface, a lower surface, and both circumferential side surfaces of each tooth 512. Each wire guide portion 62 is arranged to project downward from the body portion 61. The shape of the insulator 52 will be described in more detail below.

Each coil 53 is preferably defined by an electric wire wound around the body portion 61 of the insulator 52. That is, in the present preferred embodiment, the electric wire is wound around each tooth 512 with the body portion 61 of the insulator 52 intervening therebetween. The body portion 61 is arranged to intervene between each tooth 512 and a corresponding one of the coils 53 to provide electrical isolation between the tooth 512 and the coil 53.

An electronic circuit configured to supply drive currents to the coils 53 is preferably mounted on the circuit board 24. The circuit board 24 is arranged below the coils 53 and a plurality of magnets 33. The magnets 33 will be described below. Referring to FIG. 3, the base member 21 includes a plurality of rest portions 44 each of which is arranged to project upward from the bottom plate portion 41 on a radially inner side of the outer wall portion 43. The circuit board 24 is mounted on upper surfaces of the rest portions 44. Moreover, the circuit board 24 is preferably fixed to each rest portion 44 with a fastener such as, for example, a screw 441 inserted into the rest portion 44 from above.

In addition, referring to FIG. 2, a lead wire 25 is connected to the circuit board 24 to exchange electrical signals between the circuit board 24 and an external device. The lead wire 25 is fixed to a fixing portion 240 arranged on a lower surface of the circuit board 24. The lead wire 25 is arranged to extend from the fixing portion 240 along the lower surface of the circuit board 24 to an outside radially outward of the outer wall portion 43.

The rotating portion 3 according to the present preferred embodiment preferably includes the shaft 31, a rotor holder 32, the magnets 33, and an impeller 34.

The shaft 31 is a columnar member extending in the axial direction. The shaft 31 is preferably made, for example, of a metal such as stainless steel. The shaft 31 is arranged to rotate about the central axis 9 while being supported by the bearing portions 22. An upper end portion of the shaft 31 is arranged to project upward relative to an upper end portion of the bearing support portion 42. An annular bushing 311 is attached to the upper end portion of the shaft 31.

The rotor holder 32 is arranged to rotate together with the shaft 31 while holding the magnets 33. The rotor holder 32 is fixed to the shaft 31 through the bushing 311. Note that the rotor holder 32 may be fixed directly to the shaft 31. The rotor holder 32 includes a cover portion 321 and a cylindrical portion 322. The cover portion 321 is substantially in the shape of a plate, and is arranged to extend radially outward from the bushing 311. The cylindrical portion 322 is arranged to extend downward from an outer circumferential portion of the cover portion 321. The cylindrical portion 322 is substantially cylindrical.

Each magnet 33 is preferably substantially curved in the shape of a circular arc in a plan view. Each magnet 33 is fixed to an inner circumferential surface of the cylindrical portion 322. Each magnet 33 is arranged radially outside the armature 23. A radially inner surface of each magnet 33 defines a pole surface which is to be radially opposed to each tooth 512. The magnets 33 are preferably arranged at regular or substantially regular intervals in the circumferential direction such that north and south pole surfaces alternate with each other. Note that, in place of the magnets 33, a single annular magnet in which north and south poles are arranged alternately in the circumferential direction may alternatively be used.

The impeller 34 preferably includes a central cap portion 341, an upper cover portion 342, a lower cover portion 343, and a plurality of blades 344. The central cap portion 341 is preferably in the shape of a covered cylinder, and is fixed to both the rotor holder 32 and the bushing 311. An air inlet 345 of the impeller 34 is defined above the central cap portion 341.

The upper cover portion 342 is arranged to extend radially outward and downward from a periphery of the air inlet 345. The lower cover portion 343 is arranged to extend radially outward and downward from the central cap portion 341 below the upper cover portion 342. Each of the blades 344 is arranged to extend in the axial direction between the upper cover portion 342 and the lower cover portion 343. An air outlet 346 of the impeller 34 is preferably defined between an outer circumferential portion of the upper cover portion 342 and an outer circumferential portion of the lower cover portion 343.

Regarding the fan motor 1 described above, once the drive currents are supplied to the coils 53 of the armature 23, radial magnetic flux is generated around each of the teeth 512 of the stator core 51, and a circumferential torque is produced by interaction between the magnetic flux of the teeth 512 and that of the magnets 33, so that the rotating portion 3 is caused to rotate about the central axis 9 with respect to the stationary portion 2.

Once the rotating portion 3 is caused to rotate, an air current is generated by the blades 344 of the impeller 34. Specifically, a gas that is present above the impeller 34 is drawn into a space between the upper cover portion 342 and the lower cover portion 343 through the air inlet 345, and is then discharged radially outward through the air outlet 346.

Next, a structure of wire connection established between the armature 23 and the circuit board 24 will now be described below.

Figure 4:
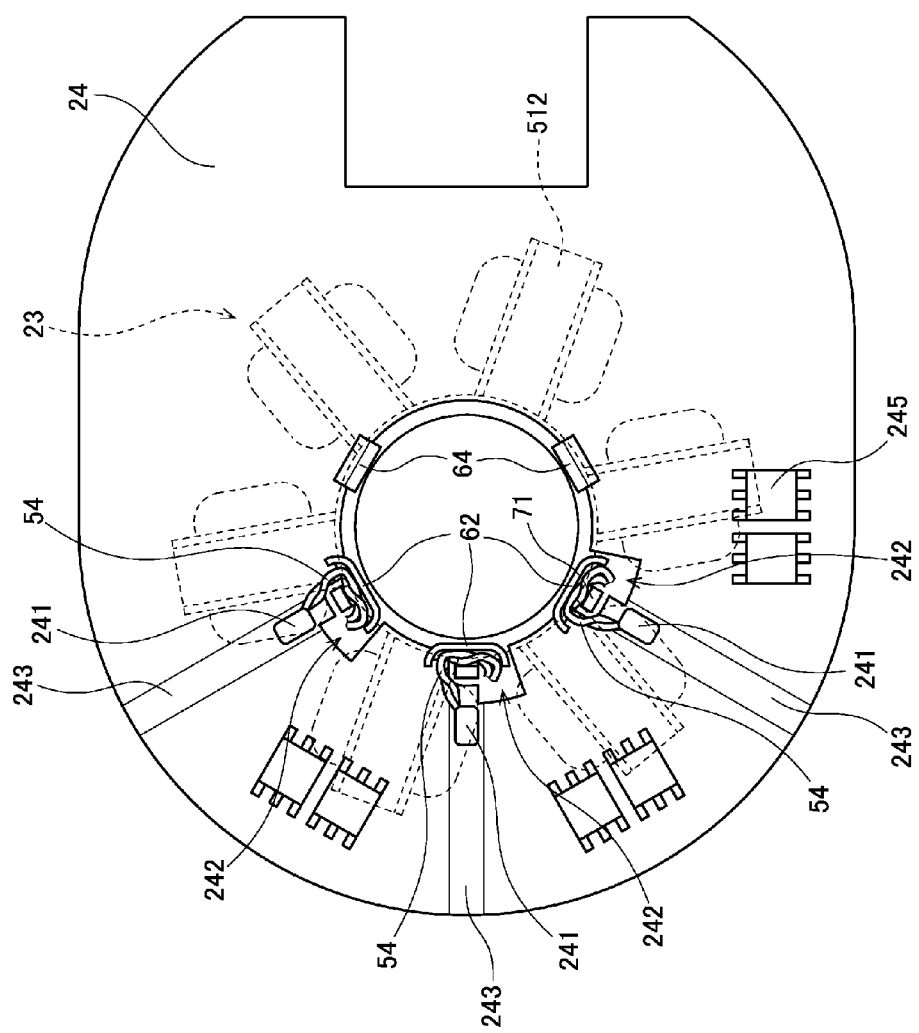
FIG. 4 is a bottom view of an armature and a circuit board according to a preferred embodiment of the present invention.

FIG. 4 is a bottom view of the armature 23 and the circuit board 24. As illustrated in FIG. 4, in the present preferred embodiment, a plurality (e.g., preferably three) land portions 241 are preferably arranged on the lower surface of the circuit board 24. Each land portion 241 is an electrical end portion of the electronic circuit mounted on the circuit board 24. In addition, the insulator 52 includes the wire guide portions 62, which are preferably, for example, three in number.

Each wire guide portion 62 is arranged radially inside a separate one of the land portions 241.

In the present preferred embodiment, for example, three drawn-out portions 54 are preferably drawn out from the coils 53. The three drawn-out portions 54 preferably correspond to, for example, a U phase, a V phase, and a W phase, respectively, of a three-phase alternating current which is inputted as the drive current. As illustrated in FIGS. 3 and 4, each drawn-out portion 54 according to the present preferred embodiment is preferably defined by two electric wires twisted together.

An inner circumferential portion of the circuit board preferably includes, for example, three cuts 242 defined therein. Each drawn-out portion 54 is drawn from a corresponding one of the coils 53 downward beyond the circuit board 24 through a corresponding one of the cuts 242. Referring to FIG. 4, in the present preferred embodiment, each of the three cuts 242 is arranged at a circumferential position between adjacent ones of the teeth 512. This arrangement reduces the likelihood that each drawn-out portion 54 extending toward the corresponding cut 242 will limit a space in which a coil 53 may be arranged, and therefore reduces the likelihood that the number of turns of each coil 53 will be limited. Note that the circuit board 24 may include through holes arranged to have the drawn-out portions 54 passing therethrough instead of the cuts 242, if so desired. Also note that the number of cuts 242 or through holes may be modified appropriately in accordance with the number of phases of the motor.

Each drawn-out portion 54 drawn downward beyond the circuit board 24 is arranged to reach a corresponding one of the land portions 241 after passing through a corresponding one of the wire guide portions 62. An end portion of the drawn-out portion 54 is then soldered to the land portion 241. The electronic circuit mounted on the circuit board 24 and the coils 53 are thus electrically connected. When the drawn-out portions 54 are soldered to the lower surface of the circuit board 24, the likelihood that a jig used during soldering or any drawn-out portion 54 will make contact with the armature 23 is reduced, and an operation of soldering is accordingly made easier.

Moreover, referring to FIG. 4, the lower surface of the circuit board 24 preferably includes strip-shaped regions 243 in each of which no electronic component 245 is arranged throughout an entire radial extent thereof. Each land portion 241 is arranged in a separate one of the strip-shaped regions 243. This arrangement reduces the likelihood that the jig used during soldering or any drawn-out portion 54 will make contact with any electronic component 245 when the drawn-out portions 54 are soldered to the respective land portions 241. The operation of soldering is thus made easier. Furthermore, each wire guide portion 62 is preferably arranged radially inside a corresponding one of the strip-shaped regions 243. This arrangement enables the drawn-out portion 54 drawn out of the wire guide portion 62 to take the shortest course to reach the land portion 241.

Figure 5:
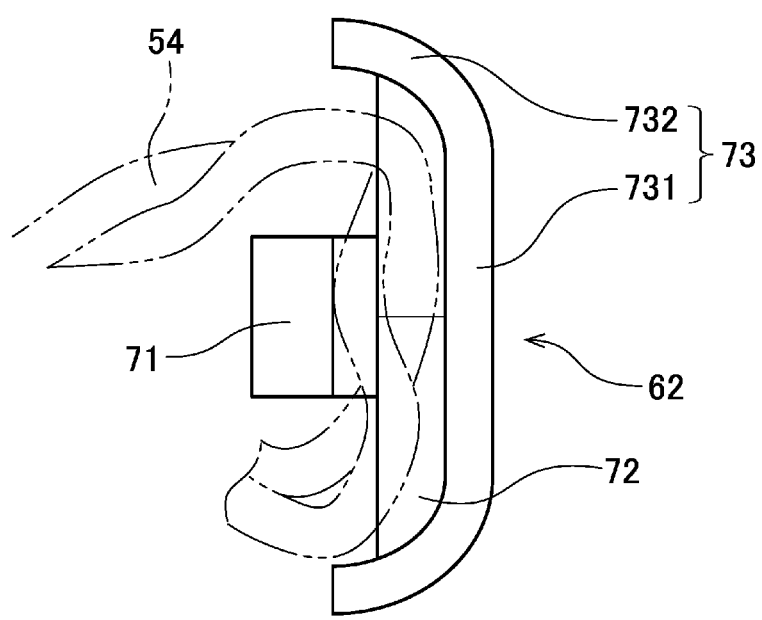
FIG. 5 is a bottom view of a wire guide portion according to a preferred embodiment of the present invention.
Figure 6:
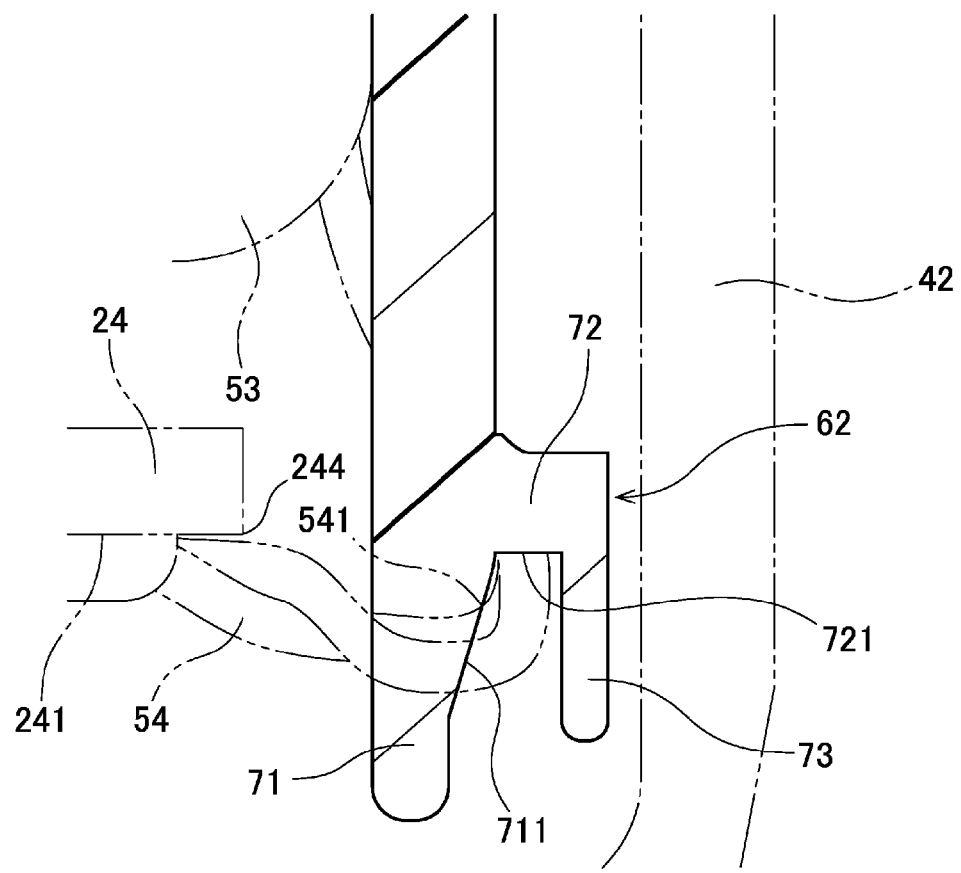
FIG. 6 is a vertical cross-sectional view of the wire guide portion according to a preferred embodiment of the present invention.
Figure 7:
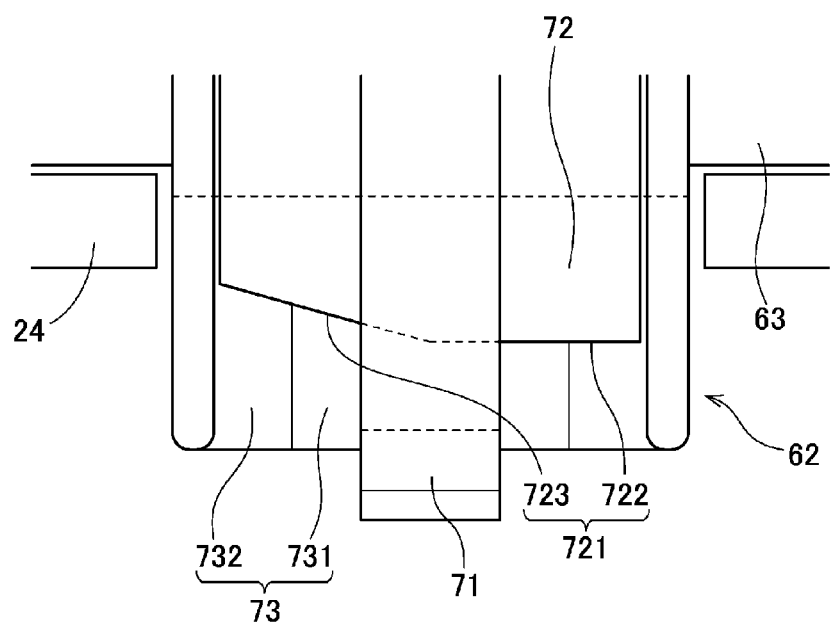
FIG. 7 is a diagram illustrating the wire guide portion according to a preferred embodiment of the present invention viewed from radially outside.

FIG. 5 is a bottom view of the wire guide portion 62. FIG. 6 is a vertical cross-sectional view of the wire guide portion 62. FIG. 7 is a diagram illustrating the wire guide portion 62 viewed from radially outside. Referring to FIGS. 5 to 7, the wire guide portion 62 preferably includes a first projecting portion 71, a flange portion 72, and a second projecting portion 73. The drawn-out portion 54 is arranged radially inward of the first projecting portion 71, below the flange portion 72, and radially outward of the second projecting portion 73.

The first projecting portion 71 is arranged to project downward from the body portion 61 of the insulator 52 on a radially inner side of the land portion 241. Referring to FIG. 4, in the present preferred embodiment, the first projecting portion 71 is arranged to extend in the axial direction through a corresponding one of the cuts 242 of the circuit board 24. A lower end portion of the first projecting portion 71 is positioned at an axial height lower than that of the lower surface of the circuit board 24.

The drawn-out portion 54 is arranged to be in contact with a radially inner surface of a portion of the first projecting portion 71 which is below the flange portion 72. A radially outward displacement of the drawn-out portion 54 is thus restricted. Moreover, in the present preferred embodiment, an area 541 of contact between the first projecting portion 71 and the drawn-out portion 54 is arranged at an axial height lower than that of the lower surface of the circuit board 24. This contributes to preventing the drawn-out portion 54 from making contact with an edge 244 of the circuit board 24 defined between the lower surface and an inner circumferential surface of the circuit board 24, and thus preventing damage of the drawn-out portion 54.

In particular, in the present preferred embodiment, the radially inner surface of the portion of the first projecting portion 71 which is below the flange portion 72 preferably includes an inclined surface 711. The inclined surface 711 is arranged to slant so as to become more distant from the central axis 9 with decreasing height. The drawn-out portion 54 is arranged to be in contact with this inclined surface 711. This reduces the likelihood that the drawn-out portion 54 will be displaced upward. This further reduces the likelihood that the drawn-out portion 54 will make contact with the edge 244 of the circuit board 24. In addition, tension acting on the drawn-out portion 54 between the contact area 541 and the land portion 241 is reduced. This contributes to more effectively preventing damage of the drawn-out portion 54. Note that the first projecting portion 71 may include a curved surface having a varying slope in place of the inclined surface 711 having a constant slope.

Moreover, circumferential side surfaces and the radially inner surface of the portion of the first projecting portion 71 which is below the flange portion 72 are preferably arranged to include a curved surface extending in the circumferential direction. In other words, the first projecting portion 71 is preferably arranged to not include an edge at either circumferential side thereof. This arrangement reduces the likelihood that a stress will concentrate on the area 541 of contact between the first projecting portion 71 and the drawn-out portion 54. This contributes to preventing damage of the drawn-out portion 54.

The flange portion 72 is arranged to extend from the first projecting portion 71 radially inward and to both sides in the circumferential direction. A lower surface of the flange portion 72 is preferably a guide surface 721 arranged to guide the drawn-out portion 54. The guide surface 721 faces downward between the first and second projecting portions 71 and 73. The guide surface 721 covers an upper portion of the drawn-out portion 54 to prevent the drawn-out portion 54 from being displaced upward. This contributes to more effectively preventing the drawn-out portion 54 from making contact with the edge 244 of the circuit board 24.

In particular, the guide surface 721 according to the present preferred embodiment is preferably arranged at an axial height lower than that of the lower surface of the circuit board and on an upper side of the drawn-out portion 54. This arrangement contributes to preventing the area 541 of contact between the wire guide portion 62 and the drawn-out portion 54 from being displaced upward above the lower surface of the circuit board 24, and thus more effectively preventing the drawn-out portion 54 from making contact with the edge 244 of the circuit board 24.

Referring to FIG. 7, the guide surface 721 according to the present preferred embodiment preferably includes a horizontal guide surface 722 and a slanting guide surface 723. The horizontal guide surface 722 is arranged to extend substantially horizontally from the slanting guide surface 723 toward the land portion 241. The slanting guide surface 723 is arranged to slant so as to increase in height with increasing distance from the horizontal guide surface 722. The end portion of the drawn-out portion 54 is drawn to pass along first the slanting guide surface 723 and then the horizontal guide surface 722. The end portion of the drawn-out portion 54 is then soldered to the land portion 241 arranged on the lower side of the circuit board 24. As a result, an end portion of the guide surface 721 on a side closer to the coil 53 is preferably positioned higher than an end portion of the guide surface 721 on a side closer to the land portion 241.

The above arrangement makes it easier to arrange the drawn-out portion 54 extending from the coil 53 to extend along the guide surface 721, and contributes to preventing a sharp bend of the drawn-out portion 54. Note that the guide surface 721 may not necessarily include the horizontal guide surface 722 and the slanting guide surface 723. The slanting guide surface 723 may be either an inclined surface having a constant slope or a curved surface having a varying slope. Also note that the entire guide surface 721, from a point where guiding starts to a point where guiding ends, may be arranged to slant.

The second projecting portion 73 is arranged to extend axially downward from the flange portion 72 on a radially inner side of the first projecting portion 71. More specifically, the second projecting portion 73 is arranged to extend axially downward from a radially inner edge portion of the flange portion 72. The drawn-out portion 54 is preferably arranged between the first and second projecting portions 71 and 73. This contributes to preventing the drawn-out portion 54 from being displaced radially inward or radially outward. This reduces the likelihood that the drawn-out portion 54 will make contact with the bearing support portion 42, which is arranged radially inward of the second projecting portion 73.

Referring to FIGS. 3, 6, and 7, in the present preferred embodiment, a lower end portion of the second projecting portion 73 is preferably arranged at an axial height higher than that of the lower end portion of the first projecting portion 71. This arrangement makes it easier to pass the drawn-out portion 54 around the first projecting portion 71. This makes an operation of arranging the drawn-out portion 54 easier.

Referring to FIGS. 5 and 7, the second projecting portion 73 according to the present preferred embodiment includes a first wall portion 731 and a pair of second wall portions 732. The first wall portion 731 is arranged to extend substantially in the circumferential direction on the radially inner side of the first projecting portion 71. The second wall portions 732 are arranged to extend radially outward on both circumferential sides of the first wall portion 731. The drawn-out portion 54 extending from the coil 53 is arranged to bend toward the land portion 241 by being arranged to extend along the first and second wall portions 731 and 732.

In particular, in the present preferred embodiment, each second wall portion 732 is preferably curved to assume a circular or substantially circular arc in a plan view. This enables the drawn-out portion 54 extending from the coil 53 to bend toward the land portion 241 while preventing the drawn-out portion 54 from bending at a sharp angle.

Figure 8:
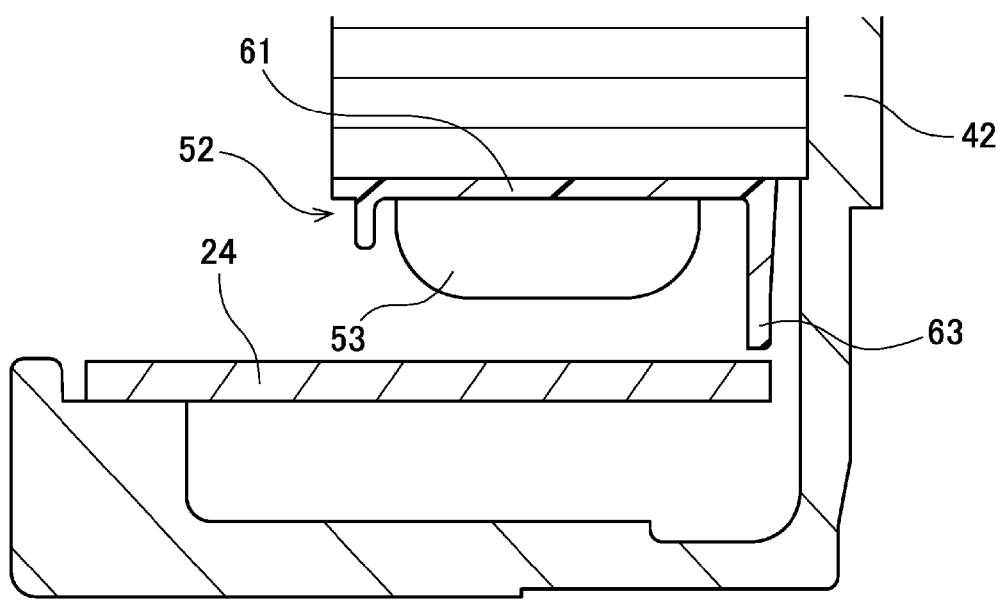
FIG. 8 is a partial vertical cross-sectional view of the stationary portion according to a preferred embodiment of the present invention.

The insulator 52 according to the present preferred embodiment preferably further includes an upper-limit positioning portion 63. FIG. 8 is a partial vertical cross-sectional view of the stationary portion 2, illustrating the upper-limit positioning portion 63. Referring to FIG. 8, the upper-limit positioning portion 63 is arranged to extend downward from a radially inner end portion of the body portion 61 of the insulator 52. A lower end portion of the upper-limit positioning portion 63 is axially opposed to an upper surface of the circuit board 24 with a gap intervening therebetween.

In a manufacturing process described below, the drawn-out portion 54 is soldered to the land portion 241 in a situation in which the upper-limit positioning portion 63 is arranged to be in contact with the upper surface of the circuit board 24. After this soldering step, the circuit board 24 is moved downward to separate the circuit board 24 from the upper-limit positioning portion 63. This leads to a reduction in the tension of a portion of the drawn-out portion 54 which extends between the wire guide portion 62 and the land portion 241. The reduction in the tension of the drawn-out portion 54 reduces the likelihood that damage, e.g., breaking, of the drawn-out portion 54 will occur.

Figure 9:
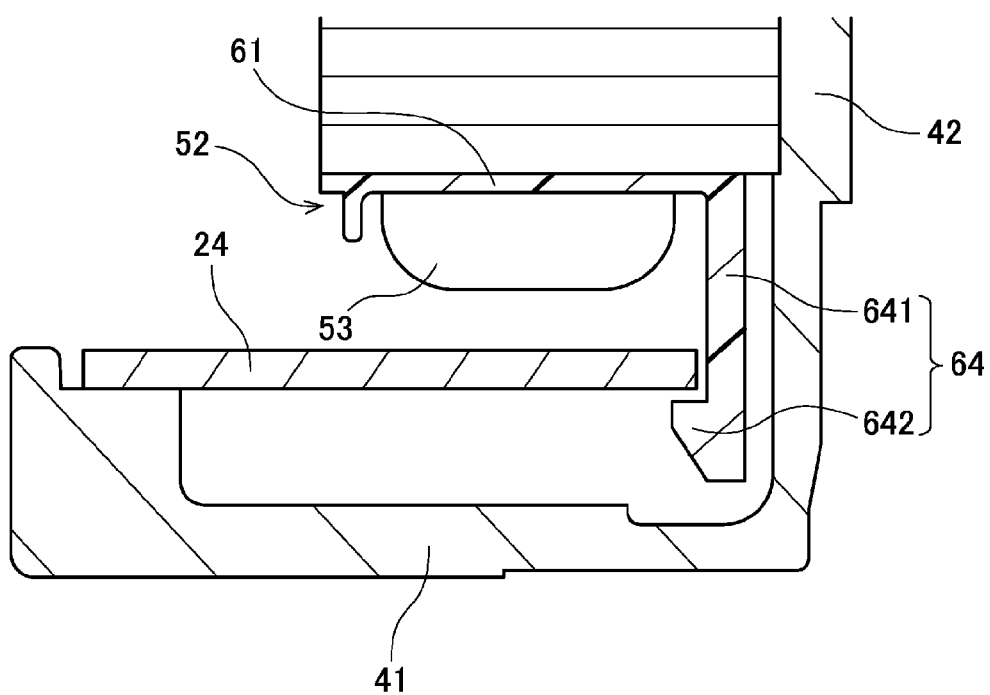
FIG. 9 is a partial vertical cross-sectional view of the stationary portion according to a preferred embodiment of the present invention.

The insulator 52 according to the present preferred embodiment preferably further includes lower-limit positioning portions 64. FIG. 9 is a partial vertical cross-sectional view of the stationary portion 2, illustrating one of the lower-limit positioning portions 64. Each lower-limit positioning portion 64 is arranged at a circumferential position away from that of each wire guide portion 62. Referring to FIG. 9, each lower-limit positioning portion 64 preferably includes a third projecting portion 641 and a hook portion 642. The third projecting portion 641 is arranged to extend downward from the radially inner end portion of the body portion 61 of the insulator 52. The hook portion 642 is arranged to project radially outward from the third projecting portion 641 on a lower side of the lower surface of the circuit board 24. An upper surface of the hook portion 642 is axially opposed to the lower surface of the circuit board 24 with a gap intervening therebetween.

In the manufacturing process described below, the drawn-out portion 54 extending from the coil 53 is preferably soldered to the land portion 241 of the circuit board 24 before the circuit board 24 is fixed to the base member 21. At this time, the hook portion 642 prevents the circuit board 24 from falling out of the insulator 52. That is, the hook portion 642 plays a role of preventing the insulator 52 and the circuit board 24 from being detached from each other during the process of manufacturing the motor 1.

Referring to FIG. 4, the lower-limit positioning portions 64 are preferably arranged at two circumferential positions according to the present preferred embodiment, for example. Note, however, that the number of lower-limit positioning portions 64 may be one or more than two, if so desired. The lower-limit positioning portions 64 are preferably arranged at regular intervals in the circumferential direction. This contributes to more effectively preventing the insulator 52 and the circuit board 24 from being detached from each other.

Figure 10:
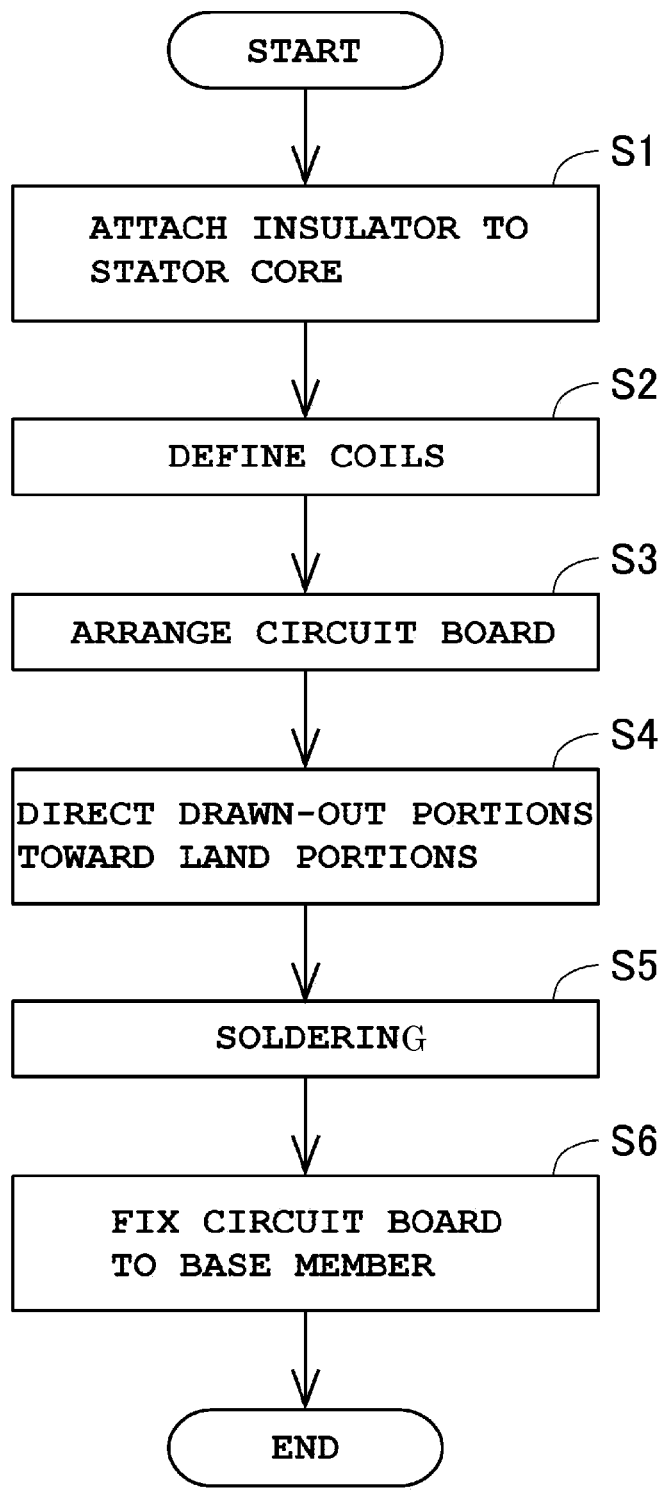
FIG. 10 is a flowchart illustrating an exemplary procedure for assembling the armature, the circuit board, and a base member according to a preferred embodiment of the present invention.

Next, a portion of a procedure of manufacturing the fan motor 1 will now be described below. FIG. 10 is a flowchart illustrating an exemplary procedure used in assembling the armature 23, the circuit board 24, and the base member 21 among the process of manufacturing the above-described fan motor 1.

In the exemplary procedure illustrated in FIG. 10, the insulator 52 is preferably first attached to the stator core 51 (step S1). Next, the electric wire is preferably wound around the body portion 61 of the insulator 52 to define each coil 53 (step S2). The armature 23 is thus obtained.

Next, the circuit board 24 is preferably arranged below the coils 53 (step S3). The circuit board 24 is arranged such that the land portions 241 face downward. In addition, at this time, the third projecting portion 641 of each lower-limit positioning portion 64 is bent to arrange the circuit board 24 on an upper side of the hook portions 642. As a result, the lower surface of the circuit board 24 is arranged at an axial height higher than that of the lower end portion of the first projecting portion 71 of each wire guide portion 62. The hook portions 642 serve to prevent the circuit board 24 from falling downward.

Thereafter, each drawn-out portion 54 extending from a corresponding one of the coils 53 is preferably passed through a corresponding one of the wire guide portions 62 and is then directed toward a corresponding one of the land portions 241 (step S4). The drawn-out portion 54 is arranged to extend along the guide surface 721 on the radially inner side of the first projecting portion 71 and on a radially outer side of the second projecting portion 73. The area 541 of contact between the drawn-out portion 54 and the wire guide portion 62 is arranged at an axial height lower than that of the lower surface of the circuit board 24.

Figure 11:
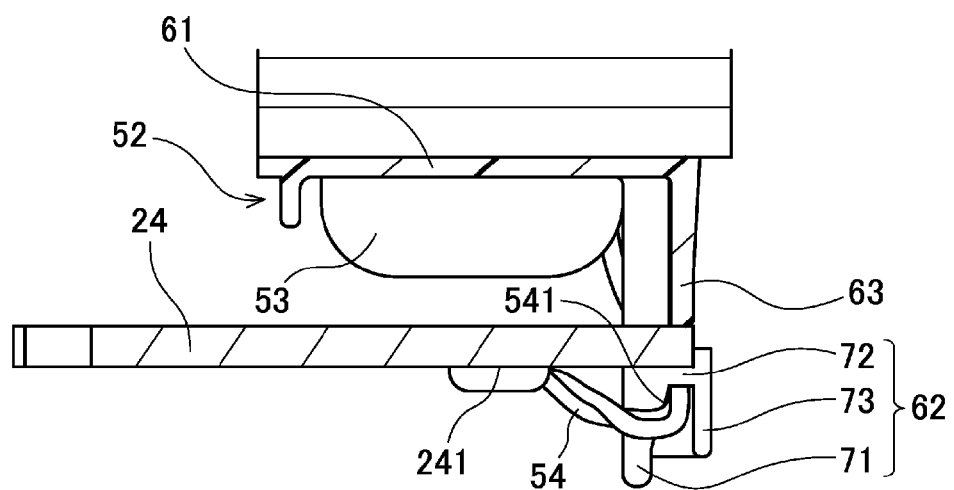
FIG. 11 is a diagram illustrating a situation in which a drawn-out portion is soldered to a land portion.

Next, the drawn-out portion 54 is preferably soldered to the land portion 241 (step S5). At this time, the upper surface of the circuit board 24 is brought into contact with a lower surface of the upper-limit positioning portion 63 as illustrated in FIG. 11. Arranging the circuit board 24 to be in contact with the upper-limit positioning portion 63 when the drawn-out portion 54 is soldered to the land portion 241 contributes to preventing a displacement of the circuit board 24, and thus facilitating the soldering operation.

Figure 12:
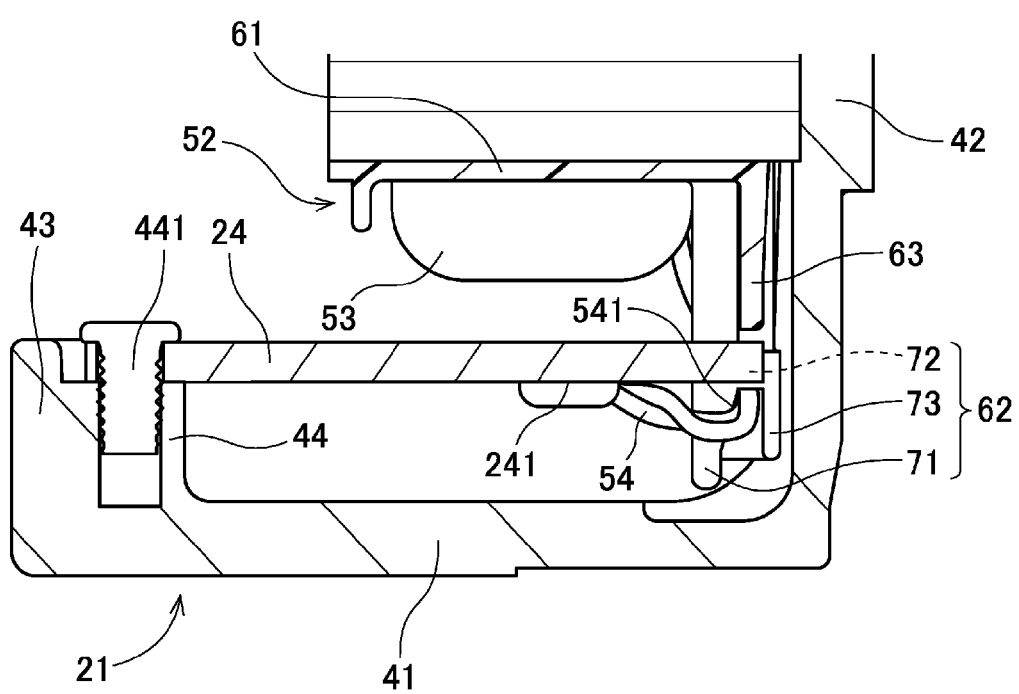
FIG. 12 is a diagram illustrating a situation in which the circuit board is fixed to the base member.

Thereafter, the circuit board 24 is preferably fixed to the base member 21 (step S6). Here, the circuit board 24 is screwed to the rest portions 44 of the base member 21 with the screw 441 inserted into each rest portion 44 from above as illustrated in FIG. 12. When the circuit board 24 is fixed to the base member 21, the lower surface of the circuit board 24 is brought into contact with the upper surface of each rest portion 44. This involves downward movement of the circuit board 24 relative to the insulator 52, and separation of the upper surface of the circuit board 24 from the lower end portion of the upper-limit positioning portion 63.

At step S6, the distance between the land portion 241 and the area 541 of contact between the drawn-out portion 54 and the wire guide portion 62 is decreased. As a result, the tension acting on the drawn-out portion 54 between the contact area 541 and the land portion 241 is reduced. This contributes to preventing damage of the drawn-out portion 54.

Note that, at step S6, the contact area 541 is preferably positioned at an axial height lower than that of the lower surface of the circuit board 24. This arrangement contributes to preventing the drawn-out portion 54 from making contact with the edge 244 of the circuit board 24, and thus more effectively preventing damage of the drawn-out portion 54.

While preferred embodiments of the present invention have been described above, it is to be understood that the present invention is not limited to the above-described preferred embodiments.

For example, each drawn-out portion may be defined by of a plurality of electric wires twisted together as in the above-described preferred embodiment, but may alternatively be defined by a single electric wire, if so desired. Also, the number of drawn-out portions which are drawn downwardly out of the circuit board may be three as in the above-described preferred embodiment, but may alternatively be one, two, or more than three. Also, a motor according to a preferred embodiment of the present invention may be an inner-rotor motor in which a magnet(s) is arranged to rotate inside of an armature.

Note that the shape of each wire guide portion and the detailed shape of the motor may be different from those illustrated in the accompanying drawings of the present application. Also note that features of the above-described preferred embodiments and the modifications thereof may be combined appropriately in any manner so as long as no conflict arises.

Preferred embodiments of the present invention are applicable to a motor and a method of manufacturing the motor, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
   a stationary portion; and
   a rotating portion supported to be rotatable with respect to the stationary portion; wherein
   the stationary portion includes:
      a plurality of teeth arranged to extend radially with a central axis extending in a vertical direction as a center;
      an insulator made of a resin and attached to the teeth;
      coils each of which is defined by an electric wire wound around the insulator; and
      a circuit board arranged below the coils, and including a land portion arranged on a lower surface thereof;
   the rotating portion includes a magnet or magnets arranged radially opposite to the teeth;
   the insulator includes:
      a body portion arranged to cover an upper surface, a lower surface, and circumferential side surfaces of each of the teeth; and
      a wire guide portion arranged to project downward from the body portion;
   the electric wire includes a drawn-out portion extending from one of the coils and arranged to reach the land portion arranged on the lower surface of the circuit board after passing through the wire guide portion;
   an area of contact between the drawn-out portion and the wire guide portion is arranged at an axial height lower than that of the lower surface of the circuit board;
   the wire guide portion includes:
      a first projecting portion arranged to project downward from the body portion on a radially inner side of the land portion; and a flange portion arranged to extend from the first projecting portion radially inward and to both sides in a circumferential direction;

a lower surface of the flange portion is a guide surface arranged to guide the drawn-out portion; and the guide surface is arranged at an axial height lower than that of the lower surface of the circuit board and on an upper side of the drawn-out portion.

2. The motor according to claim 1, wherein the circuit board includes a cut or a through hole arranged to permit the drawn-out portion to pass therethrough; and the cut or the through hole is arranged at a circumferential position between adjacent ones of the teeth.

3. The motor according to claim 1, wherein an end portion of the guide surface on a side closer to the coil is positioned higher than an end portion of the guide surface on a side closer to the land portion.

4. The motor according to claim 1, wherein a radially inner surface of a portion of the first projecting portion which is below the flange portion includes a curved surface or an inclined surface arranged to slant so as to become more distant from the central axis with decreasing height; and the drawn-out portion is arranged to be in contact with the curved surface or the inclined surface.

5. The motor according to claim 1, wherein the wire guide portion further includes a second projecting portion arranged to extend axially from the flange portion on a radially inner side of the first projecting portion; and the drawn-out portion is arranged between the first and second projecting portions.

6. The motor according to claim 5, wherein a lower end portion of the second projecting portion is arranged at an axial height higher than that of a lower end portion of the first projecting portion.

7. The motor according to claim 5, wherein the second projecting portion includes:

a first wall portion arranged to extend substantially in the circumferential direction on the radially inner side of the first projecting portion; and second wall portions arranged to extend radially outward on both circumferential sides of the first wall portion.

8. The motor according to claim 1, wherein the insulator further includes an upper-limit positioning portion axially opposed to an upper surface of the circuit board with a gap intervening therebetween.

9. The motor according to claim 1, wherein the insulator further includes a lower-limit positioning portion;

the lower-limit positioning portion includes:

a third projecting portion arranged to extend downward from a radially inner end portion of the body portion; and a hook portion arranged to project radially outward from the third projecting portion on a lower side of the lower surface of the circuit board; and an upper surface of the hook portion is axially opposed to the lower surface of the circuit board with a gap intervening therebetween.

10. The motor according to claim 1, wherein the lower surface of the circuit board includes a strip-shaped region in which no electronic component is arranged throughout an entire radial extent thereof; and the land portion is arranged in the strip-shaped region.

11. The motor according to claim 10, wherein the wire guide portion is arranged radially inside the strip-shaped region.

* * * * *